May 2, 1933. E. C. ROSENBERG 1,906,420
OIL COLLECTOR
Filed Aug. 13, 1928
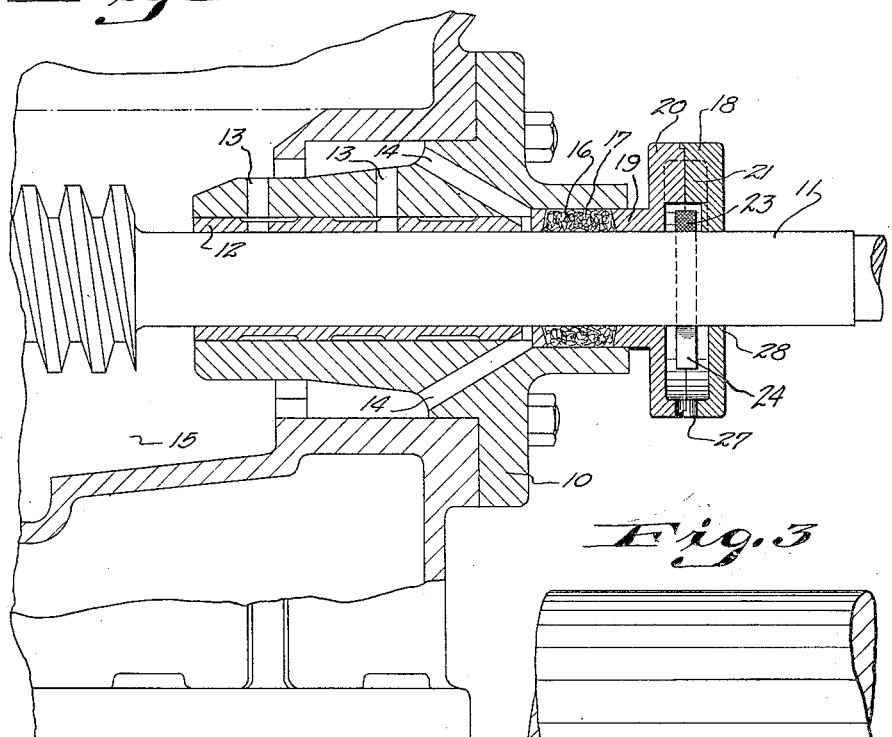
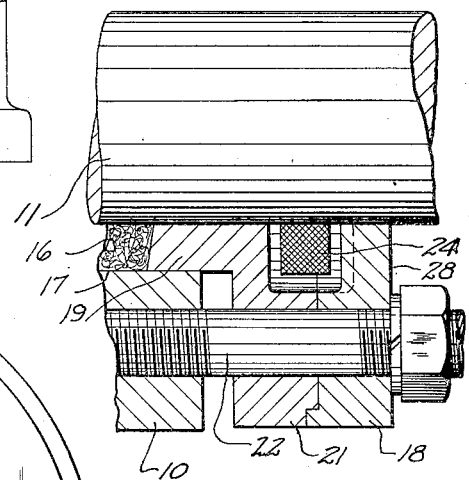
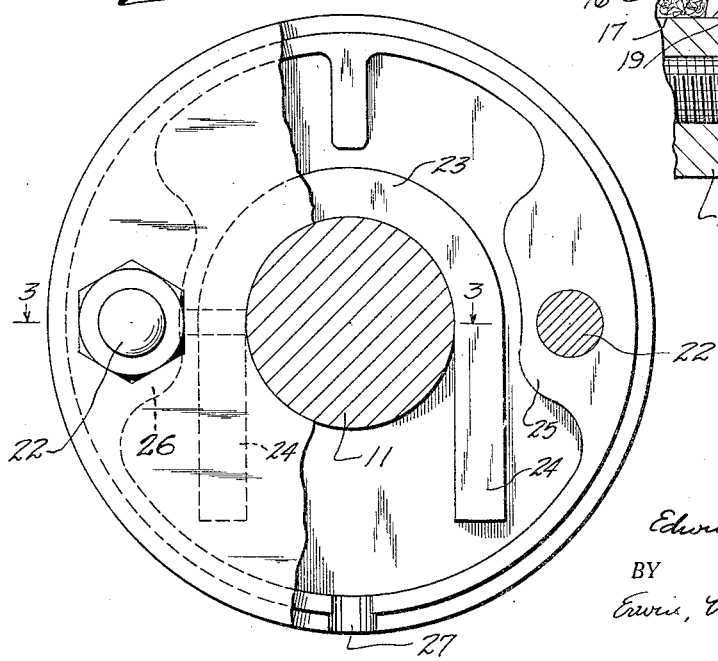
INVENTOR.
Edwin Charles Rosenberg
BY
Erwin, Wheeler & Woolard
ATTORNEYS Patented May 2, 1933

1,906,420

UNITED STATES PATENT OFFICE

EDWIN CHARLES ROSENBERG, OF MILWAUKEE, WISCONSIN

OIL COLLECTOR

Application filed August 13, 1928. Serial No. 299,191.

My invention relates to improvements in oil collectors.

The object of my invention is to provide a device to prevent the escape of oil along a rapidly revolving shaft in such a manner as to be centrifugally thrown from the shaft.

More specifically stated it is the object of my invention to provide an oil collector upon a revolving shaft protruding from an oil tight housing, whereby to prevent throwing of oil outside the housing.

Another object of my invention is to provide an oil collector for the purposes above described in combination with and preferably unitarily constructed with a packing gland and packing gland compression ring.

In the drawing:

Figure 1 is a vertical section through my oil collector and through an oil tight housing showing one form of service to which my oil collector is adapted.

Figure 2 is a view of my oil collector taken axially of a shaft in connection with which it is mounted, a portion of the shell of my oil collector being cut away to exhibit parts within the shell.

Figure 3 is a detail view along a horizontal section of my oil collector.

Like parts are identified by the same reference characters throughout the several views.

In the various views shown in the drawing I have exhibited a particular attachment of my oil collector to an elevator mechanism and I have shown an oil tight housing 10 which supports a power shaft 11 mounted in a bronze bearing 12 for comparatively rapid rotation and I have shown oil holes 13 and oil drain holes 14 following a construction which has been found most acceptable for lubrication of the bearing 12.

It has been found that in the rotation of the shaft 11 within the bearing 12 the bleed or drain tubs 14 are in a large measure successful but the pressure next the packing from the apparently forced feed of oil within the sump 15 along the shaft 11 to a point without the housing 10 still occurs and the rapidly whirling shaft has heretofore caused the escaping oil to be thrown upon the walls of the pent housing within which the elevator machinery was constructed.

Standard forms of packing as shown at 16 in a gland 17 have been found likewise to be ineffective to do much more than partially reduce the flow of oil along the shaft as indicated above and I have, therefore, provided an oil collector 18 as a solution of this problem.

As a unitary part of a compression ring 19 which performs the office of a packing gland ring I have provided a recessed flange 20 which forms one side of the shell which houses the collector ring forming an essential part of my oil collector device. This shell may be described as a split interiorly channeled annular housing 21 held together by bolts 22 which extend through the split shell into the housing 10. These bolts 22 when tightened perform the office of pressing the compression ring 19 against the packing 16 in the packing gland.

Loosely housed within the shell 21 and mounted upon the shaft 11, I have provided a U-shaped collector 23, the depending arms 24 of which are sufficiently extensive to contact with bosses 25 and 26 on the interior of the shell provided for that purpose since it is preferable in the operation of my device that the collector 23 shall remain substantially stationary upon the shaft 11 and shall not rotate with the shaft within the shell.

The collector 23 will be formed of any suitable material such as babbitt or bronze which will cause as little friction as possible and which will have sufficient weight to bear fairly tightly upon the shaft 11 since I have found that packing glands and bleed or drain tubes are inadequate to control the loss and spreading of oil. My collector substantially provides for deliberate accumulation and throwing of the oil within the collector shell where the oil may accumulate upon the walls and run down within the shell to a drain hole 27 from which it may drip to be caught within a container.

It will be noted that in my oil collector the only part that is subject to wear is the collector 23 and since the packing gland 17 with its packing 16 must be subject to inspection and renewal of the packing at varying intervals it is possible to replace the ring 23 at the same time that the packing is renewed without removing any portion of the shell from the shaft since the same bolts 22 used to control the packing 16 must be removed to enable inspection or renewal of such packing. This will likewise release the split shell so that it may be taken apart and the U-shaped collector 23 may be removed from the shaft easily and quickly.

In operation it will be found that the oil escaping through the gland 17 will be immediately thrown from the shaft at the point where the collector contacts with the shaft and that there will be substantially no oil remaining upon the shaft to escape at 28.

I claim:

1. The combination with a rotatable shaft, of an oil collector comprising a packing gland having an aperture receiving said shaft and having also an annular groove extending radially of said aperture, and a U-shaped oil collector in said groove loosely supported by said shaft with its ends projecting downwardly.

2. The combination with a rotatable shaft, of an oil collector comprising a packing gland having an aperture receiving said shaft and having also an annular groove extending radially of said aperture, and a U-shaped oil collector in said groove loosely supported by said shaft with its ends projecting downwardly, said groove being provided with a drain hole below said shaft.

3. The combination with a rotatable shaft, of an oil collector comprising a packing gland having an aperture receiving said shaft and having also an annular groove extending radially of said aperture, a U-shaped oil collector in said groove loosely supported by said shaft with its ends projecting downwardly, and means in said groove engageable by said collector to prevent rotation thereof, said groove being provided with a drain hole below said shaft.

EDWIN CHARLES ROSENBERG.